United States Patent
Tassy, Sr. et al.

(10) Patent No.: US 9,145,259 B2
(45) Date of Patent: Sep. 29, 2015

(54) COLUMN DRIVE FOR SPIRAL CONVEYORS

(71) Applicant: T&T CONSULTING AND ENGINEERING, INC., East Dundee, IL (US)

(72) Inventors: Tomas Tassy, Sr., Roselle, IL (US); Tony Suto, Elburn, IL (US)

(73) Assignee: T&T Consulting and Engineering, Inc., East Dundee, IL (US)

( * ) Notice: Subject to any disclaimer, the term of this patent is extended or adjusted under 35 U.S.C. 154(b) by 0 days.

(21) Appl. No.: 14/248,921

(22) Filed: Apr. 9, 2014

(65) Prior Publication Data
US 2014/0299450 A1    Oct. 9, 2014

Related U.S. Application Data

(60) Provisional application No. 61/810,186, filed on Apr. 9, 2013.

(51) Int. Cl.
*B65G 21/18* (2006.01)
*B65G 23/44* (2006.01)

(52) U.S. Cl.
CPC ............. *B65G 23/44* (2013.01); *B65G 21/18* (2013.01)

(58) Field of Classification Search
CPC .............. B65G 21/18; B65G 2207/24
USPC .......................................... 198/778
See application file for complete search history.

(56) References Cited

U.S. PATENT DOCUMENTS

| | | | | |
|---|---|---|---|---|
| 3,595,375 | A * | 7/1971 | Kaufman et al. | 198/778 |
| 5,191,267 | A * | 3/1993 | Machacek | 198/778 |
| 5,259,302 | A * | 11/1993 | Chen | 198/778 |
| 5,843,376 | A * | 12/1998 | Ishihara et al. | 198/778 |
| 7,921,988 | B2 * | 4/2011 | Kozman et al. | 198/778 |
| 8,181,771 | B2 | 5/2012 | Talsma | |
| 8,302,764 | B2 | 11/2012 | Johnson | |
| 8,727,109 | B2 * | 5/2014 | Layne et al. | 198/778 |
| 2004/0020749 | A1 * | 2/2004 | Wood et al. | 198/778 |
| 2005/0109581 | A1 * | 5/2005 | Roland | 198/778 |
| 2014/0021019 | A1 * | 1/2014 | Leijen | 198/778 |

* cited by examiner

*Primary Examiner* — James R Bidwell
(74) *Attorney, Agent, or Firm* — Barnes & Thornburg LLP; Mark J. Nahnsen

(57) ABSTRACT

A center column drive for a spiral conveyor is used to rotate a drive tower to move a conveyor belt in a helical pattern. The drive tower is driven by the center column drive to cause rotation about a vertical axis. The center column drive includes a base having a platform and a plurality of support legs that support the platform. The center column drive also includes a slew ring that is secured to the platform at one end and to a center column of the drive tower and a second end. Rotation of an electric gear motor causes rotation of a portion of the slew ring, which, in turn, rotates the drive tower.

25 Claims, 5 Drawing Sheets

COLUMN DRIVE FOR SPIRAL CONVEYORS

This application claims priority under 35 U.S.C. §119(e) to U.S. Provisional Application Ser. No. 61/810,186, filed Apr. 9, 2013, which is expressly incorporated by reference herein.

The present disclosure relates generally to conveyors, and more specifically to spiral conveyors.

FIELD OF THE DISCLOSURE

Background

The present disclosure relates generally to power-driven conveyors and more particularly to spiral conveyors in which a conveyor belt is positively driven in a helical path around a rotating drive tower.

Conveyor belts are often used to convey articles, such as food products and other materials, through cooled environments. Spiral conveyors, in which a conveyor belt follows a helical path winding around a central tower, drum, or cage, are used in freezers to provide a long conveying path with a small footprint. The spiral conveyor increases the retention time an item spends in the freezer to provide for ambient cooling of articles.

Some helical conveyors are constructed with a helical track supported on a central non-rotating tower. The conveyor belt is driven around the helical track by drive sprockets at a single location outside the helical path. The maximum tension in the belt, which occurs just ahead of its engagement with the drive sprockets, can be quite high for such a long belt. To reduce the maximum belt tension, overdrive spiral conveyor systems are used. In these overdrive systems, the conveyor belt is driven by frictional contact between the inside edge of the belt and the faster-rotating outer surface of the rotating drum about which the belt is helically wrapped.

Because the belt is driven along the entire helical path, the maximum belt tension is decreased. But some tension is still needed for effective frictional engagement between the drum and the belt edge. Because a large portion of the rotational energy required to drive the drum is lost to friction, the motor and power requirements can be quite high. Because overdrive systems are sensitive to friction between the outside of the drum and the inside edge of the belt, the proper settings of tension and overdrive vary from installation to installation.

Positively driven spiral systems, in which drive structure on the outside of a rotating cage engages structure on the inside of a conveyor belt, have been used to overcome some of the shortcomings of overdrive systems. In either system, a chain and sprocket arrangement is typically used to rotate the tower to drive the conveyor belt. These drive mechanisms are ineffective and require a fair amount of maintenance. Also, bearings used to allow the drum to pivot about a vertical axis of rotation are under considerable load and need regular service and replacement.

SUMMARY

The present disclosure may comprise one or more of the following features and combinations thereof.

In illustrative embodiments, the present disclosure includes a center column drive for a spiral conveyor. The drive tower is used to drive a series of vertically oriented parallel drive members that extend around the perimeter of the tower, which, in turn, drive the conveyor belt. The drive tower is driven by the center column drive to cause rotation.

In illustrative embodiments, the center column drive includes a base have a platform and a plurality of support legs that support the platform. The center column drive also includes a slew ring that is secured to the platform at one end and to a center column of the drive tower at a second end. The slew ring greatly improves the load carrying capabilities not presently found in current systems. The slew ring includes a series of gear teeth formed on an inside surface that are driven by an electric gear motor. Rotation of the electric gear motor causes rotation of a portion of the slew ring, which rotates the drive tower. This application may include an electric gear motor or servo motors and a PLC controller to precisely control belt tension.

In illustrative embodiments, the spiral conveyor includes a servo belt take-up drive motor used to remove slack in the conveyor belt. The use of servo motors for the center column drive and the belt take up drive in combination with a PLC controller, allows for precise control of the speed and tension in the conveyor belt so that slack in the belt is minimized. The use of the servo motors in this application provides the necessary communication between the center column drive and the belt take up system. This also provides the necessary load and torque sensing capability of the system not found on existing spiral conveyors.

These and other features of the present disclosure will become more apparent from the following description of the illustrative embodiments.

DETAILED DESCRIPTION

Figure 1:
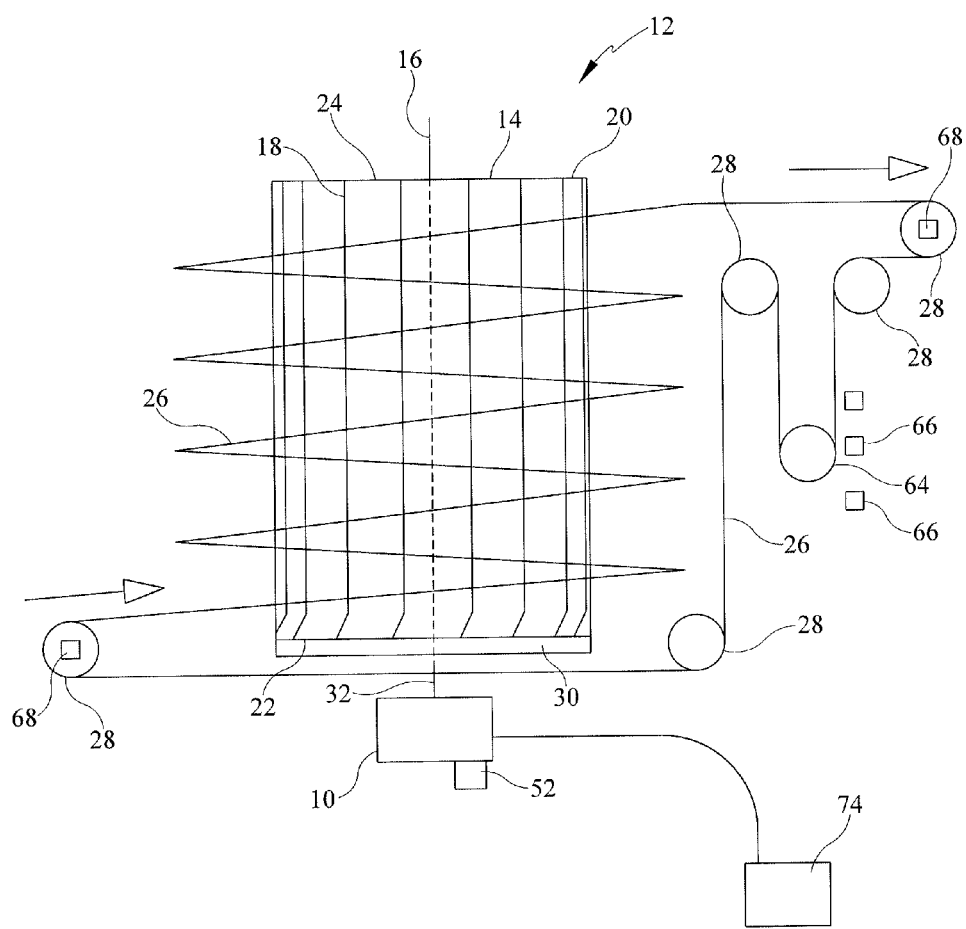
FIG. 1 is a diagrammatic view of a spiral conveyor used to convey items around a circular pathway and showing a drive tower having a drive belt extending helically around the drive tower and also showing a series of pulleys that includes a slack take-up pulley.

For the purposes of promoting an understanding of the principles of the disclosure, reference will now be made to a number of illustrative embodiments illustrated in the drawings and specific language will be used to describe the same.

This disclosure describes a central column drive 10 for spiral conveyors 12. Center column drive 10 is used in connection with a spiral conveyor 12 to drive a drive tower 14, as shown, for example, in FIG. 1. The drive tower 14 is in the form of a cylindrical drum or cage that is driven to rotate about a vertical axis 16. The rotating tower 14 includes a plurality of parallel spaced substantially vertical drive members 18. Driven members 18 are spaced apart regularly around the periphery 20 of the drive tower 14.

Each drive member 18 extends in length between the bottom 22 and the top 24 of the drive tower 14. A conveyor belt 26 follows a multi-tiered helical path around the tower 14. The path is defined by a helical carryway or by a carryway at the bottom and stacker plates mounted on the belt. The inside edge of the belt 26 positively engages the drive members 18, which drive the belt up the tower 14 as it rotates. The belt 26 travels around various take-up, idle, and feed sprockets 28 as it makes it way from the exit at the top 24 of the tower 14 back to the entrance at the bottom. The tower 14 is mounted at its bottom 22 to a base 30 and is rotated by the center column drive 10, as will be described in more detail below.

Drive tower 14 includes a center column 32 that is vertically oriented in the tower 14. Center column 32 includes upper and lower attachment rings 34 that allow for attachment of the vertical drive members 18. Center column 32 rotates with the drive tower 14 and is connected to the center column drive 10.

Center column drive 10 includes a turn table base 36 that supports the drive tower 14. Base 36 includes a generally horizontal upper platform 38 and a series of generally vertical legs 40 coupled to the platform 38. Legs 40 may include adjustable feet 42 that allow the base 36 and the drive tower 14 to be leveled. Base 36 is further secured by use of outer main posts 44 and cross member supports 46. Cross member supports 46 interconnect outer main posts 44 to legs 40 to further secure the drive tower 14. Outer main posts 44 may also include adjustable feet 48 that permit leveling of the drive tower 14 and base 36.

Figure 2:
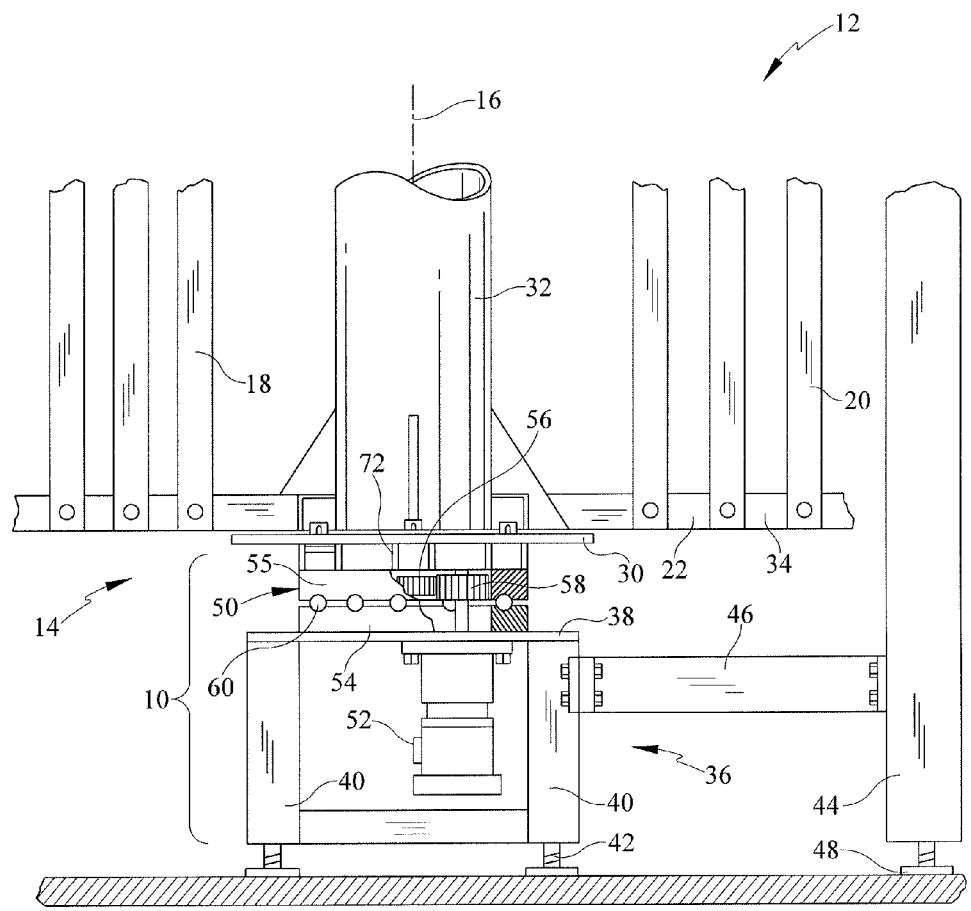
FIG. 2 is a perspective view of the spiral conveyor showing a portion of the drive tower and a center column drive used to rotate the drive tower, the center column drive including a base having a slew ring and an electric drive motor used to rotate a portion of the slew ring to rotate the drive tower, the slew ring including a series of bearings to support the load created by the drive tower and belt system.
Figure 3:
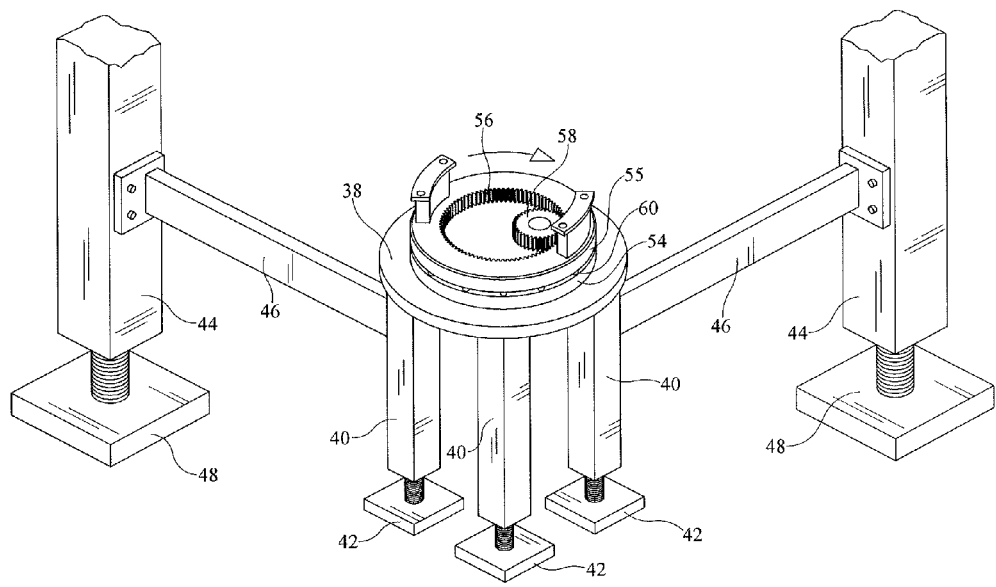
FIG. 3 is a perspective view of the center column drive showing the base having a platform and a series of vertically extending legs supporting the platform, the platform configured to include the slew ring, which is driven by an electric gear motor, the base being supported by several cross members and vertically oriented outer posts.

Base 36 of center column drive 10 also includes a slew ring 50 that is coupled to the center column 32 by use of brackets 72 and is driven by an electric gear motor 52 through the use of a gearbox 70. Slew ring 50 is capable of carrying large axial, radial and moment loads within a compact dimension envelope. Slew ring 50 is also coupled to platform 38 and can be an internal drive type, as shown in FIGS. 2 and 3, or an external drive where the drive gear teeth are external (not shown). Slew rings 50 are manufactured by several companies such as NBC Group, LTD, for example.

Slew ring 50 includes a base ring 54 that is secured to the platform 38 and a top ring 56 that is secured to the center column 32. Top ring 55 and base ring 54 are adapted to rotate with respect to each other by use of a series of bearings 60. Top ring 55 includes a set of gear teeth 56 formed on an inner surface thereof. Electric gear motor 52 includes a drive gear 58 that engages with gear teeth 56 of slew ring 50. Energizing of electric gear motor 52 causes rotation of drive gear 58, which causes rotation of top ring 55 with respect to bottom ring 54.

Figure 4:
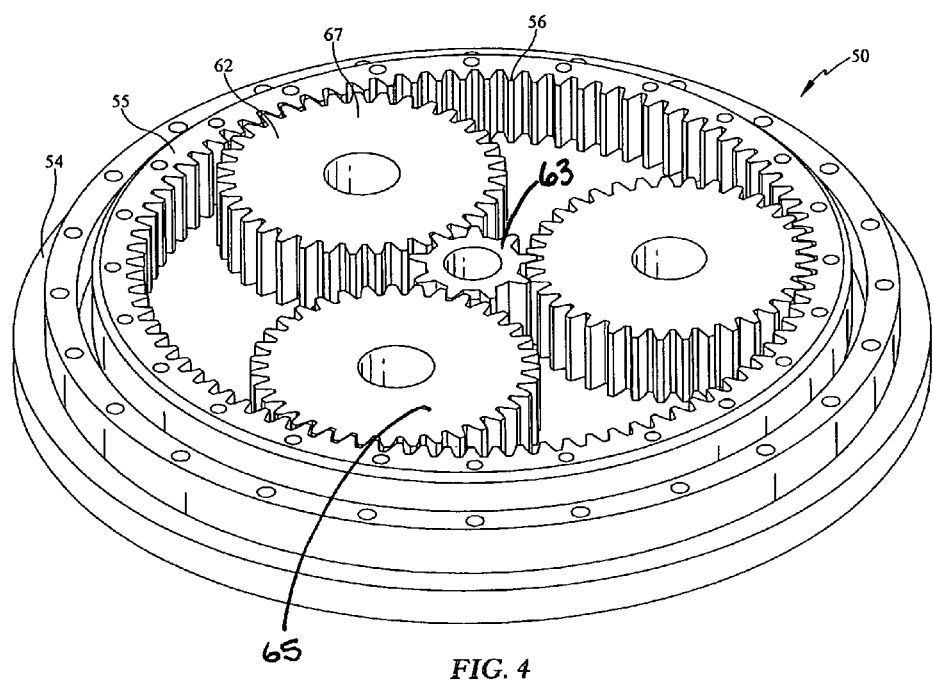
FIG. 4 is a perspective view of a slew ring having a planetary gear set positioned within the slew ring.

Alternatively, a planetary gear set 62 can be used in combination with an electric motor to drive the slew ring 50, as shown, for example, in FIG. 4. Planetary gear set 62 includes a sun gear 63 surrounded by planetary gears 65. Sun gear 63 is coupled to an electric motor and planetary gears 65 drive slew ring 50 by engagement with gear teeth 56 formed on the inner surface. Use of the planetary gear set 62 permits the use of a smaller horsepower electric motor and gearbox and results in increased longevity of the components. In another embodiment, slew ring 50 can include gear teeth (not shown) on the exterior surface of the top ring 55 and the electric drive motor can be mounted external to the slew ring 50.

Figure 5:
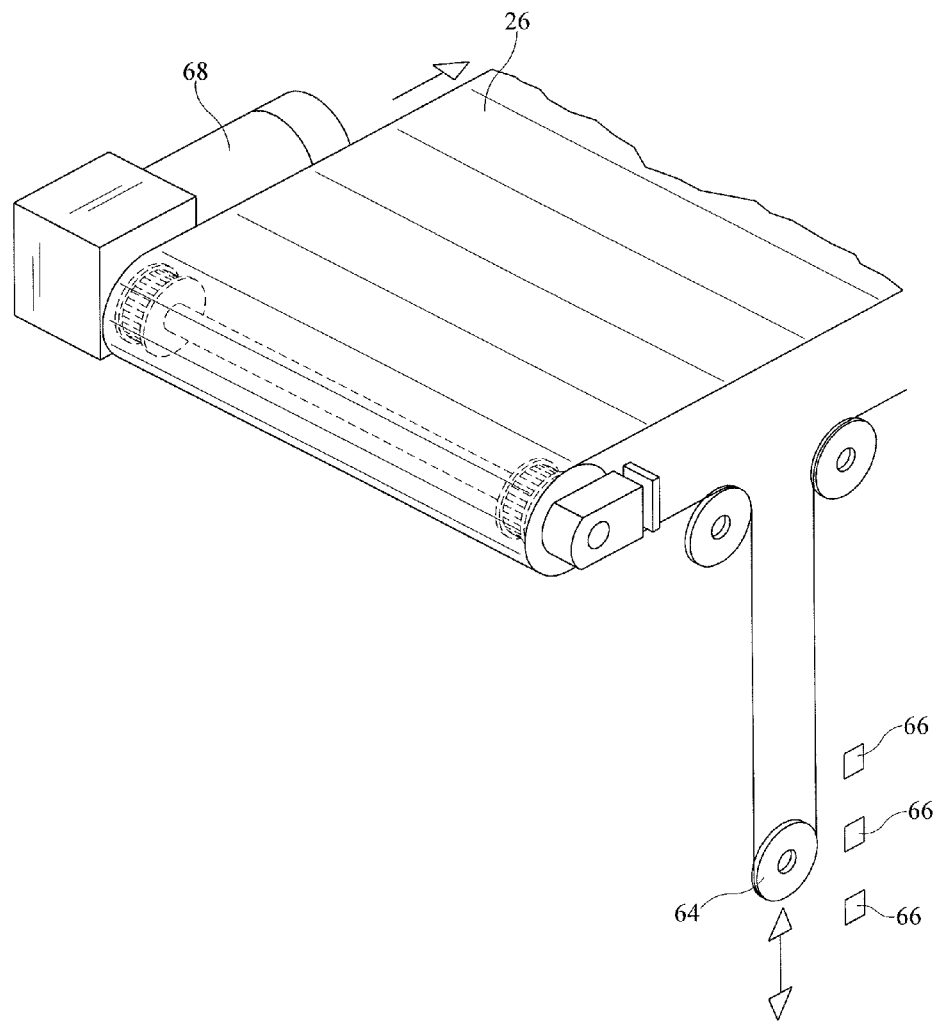
FIG. 5 is a perspective view of a portion of the conveyor used in the spiral conveyor 12 showing a servo motor used for belt take up.

Because of the direct drive arrangement of the center column 32 by the center column drive 10, motor speed can be precisely controlled. As shown in FIGS. 1 and 5, belt 26 passes through a series of pulleys or rollers including take-up pulley 64. Take up pulley 64 is typically weighted or spring loaded to take up slack in the belt system when weight is either added or removed from the belt 26. The belt 26, when off of the drive tower 14 is moved by use of servo motors 68. Servo motors 68 are controlled by a controller.

As can be seen in FIG. 1, a plurality of position sensors 66 are located along the pathway of the take up pulley 64. Sensors 66 transmit the position of the take up pulley 64 to a PLC type controller 74, which can precisely control the speed of both a servo drive motor 52 and the servo belt motors 68 so that slack in the belt can be controlled.

A Programmable Logic Controller, PLC or Programmable Controller is a digital computer used or automation of electromechanical processes, such as control of machinery on factory assembly lines. The PLC is designed for multiple inputs and output arrangements, such as inputs received from the servo motors. Programs to control machine operation are typically stored in battery-backed-up or non-volatile memory. If items, such as foodstuffs, are added to the belt 26, the PLC controller can increase or decrease the speed of the servo motors 52 and 68 based upon input received from the servo motors to increase or decrease the amount of slack in the belt 26 as required.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A center column drive spiral conveyor system comprising:
   a rotating cylindrical drive tower having a lower end and a spaced apart upper end and having a central column, the drive tower adapted to rotate about a vertical axis of rotation;
   a plurality of parallel drive members coupled to the drive tower, the drive members extending in length from the lower end to the upper end of the drive tower;
   a conveyor belt extending helically around the drive tower, the drive members adapted to engage the conveyor belt;
   a center column drive that is adapted to rotate the center column, the center column drive including a drive ring having an upper ring coupled to the drive column and a lower ring, the upper ring adapted having a plurality of gear teeth and configured to rotate with respect to the lower ring; and
   a drive motor that is adapted to rotate the upper ring to cause the rotation of the drive tower and movement of the conveyor belt.

2. The center column drive spiral conveyor system of claim 1, wherein the center column drive includes a planetary gear set that is adapted to multiply the torque output of the drive motor.

3. The center column drive spiral conveyor system of claim 2, wherein the planetary gear set engages the gear teeth of the upper ring.

4. The center column drive spiral conveyor system of claim 1, wherein the drive ring is a slew ring.

5. The center column drive spiral conveyor system of claim 1, wherein the conveyor belt exits the drive tower and passes over an exit roller and passes through a series of rollers including a take-up roller.

6. The center column drive spiral conveyor system of claim 5, wherein the take-up roller is weighted or spring biased to take up slack in the conveyor belt when weight from products being conveyed is either added or removed from the conveyor belt.

7. The center column drive spiral conveyor system of claim 6 wherein the exit roller is driven by a servo belt motor and the servo belt motor and the drive motor are controlled by a controller.

8. The center column drive spiral conveyor system of claim 7, further including a plurality of position sensors located along the pathway of the take up roller, wherein the sensors transmit the position of the take-up roller to the controller, which controls the speed of each of the drive motor and the servo belt motor to adjust the amount of slack in the conveyor belt.

9. The center column drive spiral conveyor system of claim 1, further including a base member for supporting the center column drive.

10. The center column drive spiral conveyor system of claim 9, wherein the base member includes a generally horizontal upper platform and a plurality of support legs coupled to the platform.

11. The center column drive spiral conveyor system of claim 10, wherein the legs include adjustable feet that can be adjusted to allow the base member and the drive tower to be leveled.

12. The center column drive spiral conveyor system of claim 11 wherein the base member is secured by outer main posts and cross member supports that interconnect the outer main posts to the support legs.

13. The center column drive spiral conveyor system of claim 12, wherein the outer main posts include adjustable feet that can be adjusted to assist in leveling the base and the drive tower.

14. A center column drive spiral conveyor system comprising:
- a rotating cylindrical drive tower having a lower end and a spaced apart upper end and having a central column, the drive tower adapted to rotate about a vertical axis of rotation;
- a plurality of parallel drive members coupled to the drive tower, the drive members extending in length from the lower end to the upper end of the drive tower;
- a conveyor belt extending helically around the drive tower, the drive members adapted to engage the conveyor belt;
- a center column drive that is adapted to rotate the center column, the center column drive including a drive ring having an upper ring coupled to the drive column and a lower ring, the upper ring adapted having a plurality of gear teeth and configured to rotate with respect to the lower ring;
- a base member for supporting the center column drive; and
- a drive motor that is adapted to rotate the upper ring to cause the rotation of the drive tower and movement of the conveyor belt.

15. The center column drive spiral conveyor system of claim 14, wherein the base member includes a generally horizontal upper platform and a plurality of support legs coupled to the platform.

16. The center column drive spiral conveyor system of claim 15, wherein the legs include adjustable feet that can be adjusted to allow the base member and the drive tower to be leveled.

17. The center column drive spiral conveyor system of claim 16 wherein the base member is secured by outer main posts and cross member supports that interconnect the outer main posts to the support legs.

18. The center column drive spiral conveyor system of claim 17, wherein the outer main posts include adjustable feet that can be adjusted to assist in leveling the base member and the drive tower.

19. The center column drive spiral conveyor system of claim 14, wherein the center column drive includes a planetary gear set that is adapted to multiply the torque output of the drive motor.

20. The center column drive spiral conveyor system of claim 19, wherein the planetary gear set engages the gear teeth of the upper ring.

21. The center column drive spiral conveyor system of claim 14, wherein the drive ring is a slew ring.

22. The center column drive spiral conveyor system of claim 14, wherein the conveyor belt exits the drive tower and passes over an exit roller and passes through a series of rollers including a take-up roller.

23. The center column drive spiral conveyor system of claim 22, wherein the take-up roller is weighted or spring biased to take up slack in the conveyor belt when weight from products being conveyed is either added or removed from the conveyor belt.

24. The center column drive spiral conveyor system of claim 23 wherein the exit roller is driven by a servo belt motor and the servo belt motor and the drive motor are controlled by a controller.

25. The center column drive spiral conveyor system of claim 24, further including a plurality of position sensors located along the pathway of the take-up roller, wherein the sensors transmit the position of the take-up roller to the controller, which controls the speed of each of the drive motor and the servo belt motor to adjust the amount of slack in the conveyor belt.

* * * * *